J. F. SPJUT.
ADJUSTABLE SLIDE JOINT AND VALVE.
APPLICATION FILED APR. 7, 1913.
1,070,993.
Patented Aug. 19, 1913.
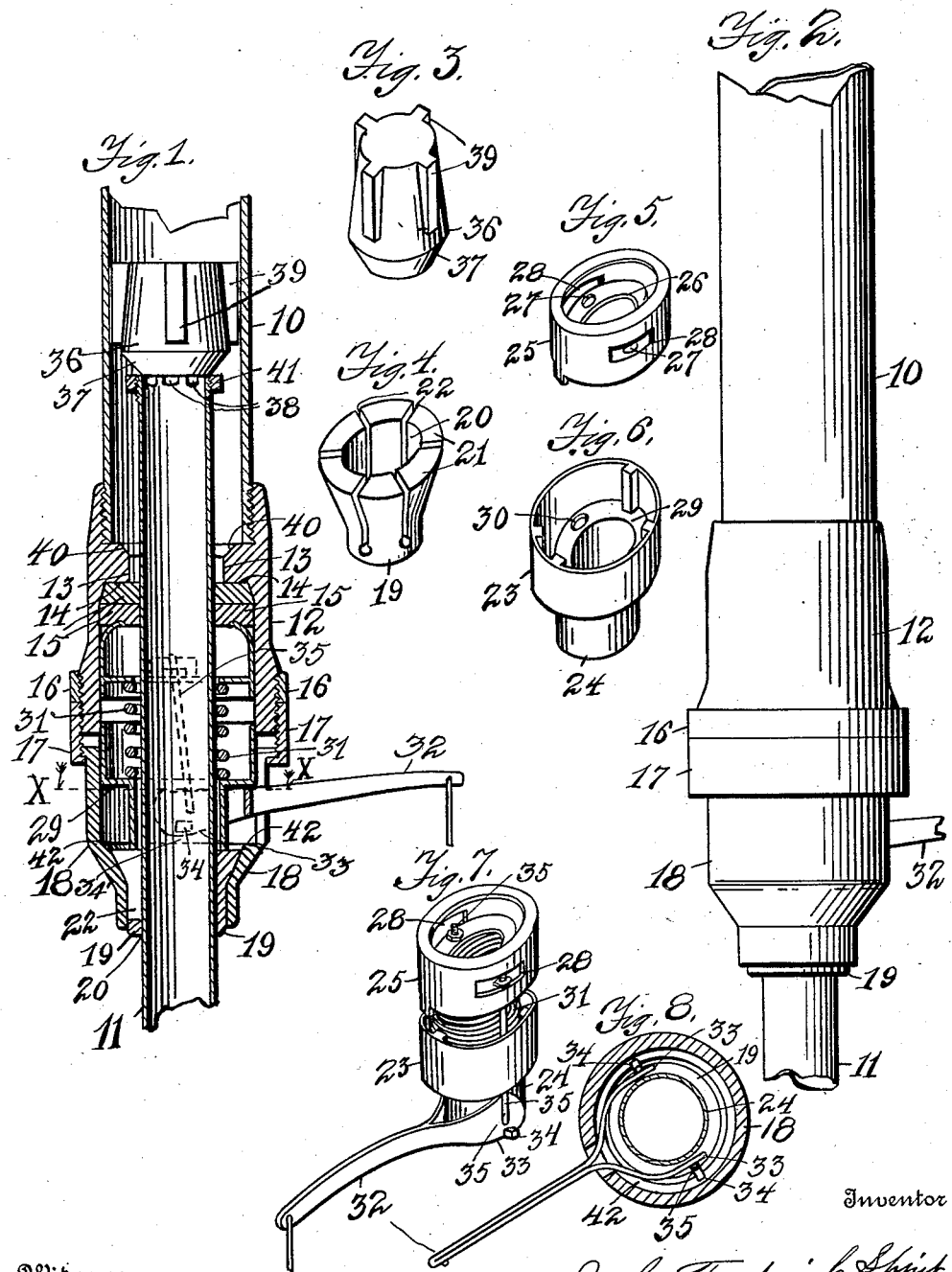

UNITED STATES PATENT OFFICE.

JOHN FREDERICK SPJUT, OF JAMESTOWN, NEW YORK.

ADJUSTABLE SLIDE JOINT AND VALVE.

1,070,993.  Specification of Letters Patent.  Patented Aug. 19, 1913.

Application filed April 7, 1913.  Serial No. 759,413.

*To all whom it may concern:*

Be it known that I, JOHN FREDERICK SPJUT, a subject of the King of Sweden, residing at the city of Jamestown, in the county of Chautauqua and State of New York, have invented certain new and useful Improvements in Adjustable Slide Joints and Valves, of which the following, taken in connection with the accompanying drawings, is a specification.

The invention relates to sliding joints, particularly for supporting gas chandeliers; and the object of the improvement is to provide a simple combined sliding joint and valve whereby the chandelier may be raised or lowered without danger of gas leakage and will be firmly held at the adjusted point; and the invention consists in the construction and combination of the parts as shown in this specification and the accompanying drawings and pointed out in the claims.

In the drawings, Figure 1 is a lengthwise sectional view of the sliding joint and valve. Fig. 2 is an elevation of the same with the pipes broken away above and below the joint. Fig. 3 is a perspective view of the valve block for controlling the gas in the upper tube. Fig. 4 is a perspective view of the slotted clamping ring. Figs. 5 and 6 are perspective views of the upper and lower portions of the inner casing for the clamping spring; and Fig. 7 is a similar view of the united parts of the spring and lever controlled clamp operating mechanism. Fig. 8 is a crosswise sectional view at line X X in Fig. 1, showing the arrangement of the lever and its connection to the clamping mechanism.

Like numerals of reference refer to the corresponding parts in the several viws.

The numeral 10 designates the upper gas pipe and the numeral 11 the lower, which is slidably mounted within the upper pipe 10 and hence must be of smaller diameter.

It is apparent that the sliding joint between the gas pipes 10 and 11 must be absolutely tight against leakage at all times, yet permit the easy adjustment of one pipe within the other, as desired, in order to raise and lower a chandelier or to lengthen or shorten the two pipes 10 and 11 for any other purpose. This is accomplished in the following manner: A ring 12 is attached to the lower end of the pipe 10 and has an annular inward projecting flange 13 to form a shoulder 14 for the packing of rings 15. The outer periphery of the lower end of the ring 12 is threaded to receive thereon the rings 16 and 17. A ring 18 is provided at its upper end with a flange joint with the screw ring 17 to form a union with the lower end of the ring 12 and be clamped thereto by the screw ring 17. The ring portion 18 receives the slotted clamping ring 19 within its lower end. The upper end of the slotted clamping ring is enlarged to fit within a similarly shaped opening within the ring 18 so that said clamping ring can not move downward out of place but must be forced into clamping contact on the pipe 11. A hole 20 within the clamping ring 19 slidably fits the outer surface of the pipe 11 so that it will move smoothly thereon in sliding up and down. The outer periphery of the ring 19 at the upper end is made at a gradual incline, as is also the opening within the ring 18 so that pressure on the upper end of the block 19 will cause the parts 21 to be firmly pressed against the periphery of the pipe 11 thereby holding the joint firmly in place. The open ended slots 22 are all cut from the upper end to within a short distance of the lower end of the ring 19 thereby permitting sufficient outward and inward movement of the parts 21 of the ring 19 to clamp the pipe 11. In order to give the desired pressure upon the upper end of the block 19 an inner casing part 23 is provided having a downward extension 24 thereon which rests upon the top of the block 19. A second inner casing part 25 of the same diameter as the portion 23 is provided having an inwardly projecting flange 26 with a hole 27 therethrough at each side opposite a hole 28 in each of the opposite sides of the casing part 25. The downward projecting portion 24 of the part 23 is of less diameter than said part 23 thereby providing a shoulder 29 through which the holes 30 are provided. A coil spring 31 is placed within the inner casing parts 23 and 25, resting upon the ledge 29 and extending up against the flange 26. A lever 32 has a yoke-shaped end 33; the arms of the yoke are pivotally attached at 34 to a rod or link 35 on the opposite sides of the portion 24 but separate therefrom. The arms 33 each have a rod or link 35 pivotally attached thereto and extending up through the holes 27 and 30 in parts 23 and 28 to receive a nut on each of the threaded upper ends thereby connecting the parts 23 and 25 and holding the spring 31 normally under compression so that the lever 32 is normally held at the upward limit of its movement with the spring 31 expanded. The upper end of the ring 25 rests against the packing rings 15 and the pressure of the spring 31 against the upper end of the clamping ring 19 furnishes sufficient pressure to cause said rings to be pressed firmly against the outer surface of the pipe 11 thereby holding the joint wherever desired upon the periphery of said pipe 11. To relieve this clamping pressure pull downward upon the lever 32 which action of the lever compresses the spring 31 and removes the pressure of the ring 24 from the upper end of the clamping ring 19 so that upward pressure on the pipe 11 will release the clamping ring 19 from its pressure and permit the easy sliding of the pipes 11 upward or downward within the pipe 10.

In order that the gas may not escape when the joint is opened, either by the removal of the chandelier, or to permit the removal of pipe 11 from pipe 10 for any purpose, a valve block 36 is provided having a tapered surface 37 on its lower end, and flanged extensions 39 on its upper end to hold the valve block in line within the upper gas pipe 10. A series of notched openings 38 are provided in the upper end of the pipe 11 so that as the valve block 36 normally rests thereon the gas will have free access to the interior of the pipe 11 from the interior of the pipe 10 around the valve block 36, the flanges 38 permitting the free flow of the gas around the valve block 36. The upper side of the inwardly projecting flange 13 is provided with a valve seat 40 to receive the beveled portion 37 of the valve block 36 thereon when the pipe 11 is withdrawn from the joint or drawn below said flange 13, thereby completely and automatically closing the lower end of the pipe 10, yet permitting the reinsertion of the pipe 11 and the raising of the valve block 36 so that the slide joint may be opened or closed whenever desired without danger of leakage, either with or without the removal of pipe 11 from pipe 10.

The rods 35 which connect the arms 33 of the lever 32 to the upper portion 25 of the inner casing, are with the arms 33 independent of the lower portion 24. The arms 33 have the trunnions or sidewise projections 34 which rest on the ledge or shoulder 42 within part 18 at each side and thereby give a bearing for the arms 33 when the outer end of lever 32 is pulled downward. A slight compensating space 34' is provided between the trunnions 34 and the shoulder 42, as shown in the dotted line in Fig. 1. This slight compensating space insures the removal of the pressure on the extension 24 on part 23 from the upper end of the clamping ring 19. The trunnions 34 seek the bearing on the shoulder 42 at each side almost instantaneously and the continued downward movement of the outer end of the lever 32 presses upward against the under side of the shoulder 29 by the inner ends of each of the arms 33, thereby pressing the part 23 upward and the spring 31, at the same time drawing downward upon the part 25 and relieving the pressure of the clamping ring 19 upon the pipe 11 as stated. It is apparent that the spring 31 pressing upon the ledge or shoulder 29 in the inner casing part 23 and against the projecting flange 26 in part 25 presses the two parts of the inner casing from one another, forcing the part 24 against the upper end of the clamping ring 19 and the upper end of the part 25 against the packing rings 15. The downward movement of the outer end of the lever 32 presses upward on the part 23 thereby relieving the pressure of the part 24 on the clamping ring 19, as hereinbefore stated.

The packing rings 15 shut out the gas from the slide joint mechanism and leave only the pipe 11 as an outlet through the notches 38. A ring 41 or sidewise extension of the upper end of the pipe 11 is provided which engages the packing rings 15 when the pipe 11 is drawn down against the packing rings 15 and withdraws said packing rings 15 when desired from the part 12.

The inner face of the flange 13 is preferably of sufficient width to permit the projecting ring 41 to pass below the valve seat 40 sufficiently to allow the valve block 36 to seat on the valve seat 40 without moving the packing rings 15 from the shoulder 14. This arrangement shuts off the gas and permits the repair or alteration of the chandelier without opening the slide valve or separating the pipe 11 from the pipe 10 and without danger of gas leakage, since the valve block 36 with the pressure of the gas upon the same will firmly close the pipe 10.

I claim as new:

1. In a device of the class described, a pipe, an inwardly projecting flange near the lower end of said pipe, a valve seat on the upper side of said inwardly projecting flange, a smaller pipe inserted within said inwardly projecting flange and having notches in its upper end, packing rings below said inwardly projecting flange slidably mounted on said smaller pipe to prevent the escape of the gas, and a valve block formed on its lower end to fit said valve seat on said flange and ride on the upper end of said smaller pipe, substantially as and for the purpose specified.

2. In a device of the class described, a pipe, an inwardly projecting annular flange near the lower end of said pipe, a valve seat on the upper side of said inwardly projecting flange, a second pipe inserted within said inwardly projecting flange and having notches on its upper end, packing rings below said inwardly projecting flange slidably mounted on said second pipe to prevent the escape of the gas and means for holding said packing rings, an outwardly projecting flange on the upper end of said second pipe to engage said packing rings and prevent the withdrawal of said second pipe therefrom, a valve block to fit said valve seat and ride on the upper end of said second pipe when above said valve seat, and flanges on the outer side of said valve block permitting the flow of the gas around said block when not seated on said valve seat.

3. In a device of the class described, a pipe, an inwardly projecting flange on the lower end of said pipe, a smaller pipe extending up within said flange and first pipe, packing rings around said smaller pipe adjacent the lower side of said flange to prevent the escape of gas, a divided casing, a coil spring within said divided casing and pressing one part thereof against said packing rings, a slotted clamping ring slidably mounted on said smaller pipe and receiving the pressure of the second part of said casing, means for holding said casing and clamping rings in place around said smaller pipe and permit the movement of the same therethrough, and means for releasing the pressure of said spring on said slotted clamping ring to permit the sliding of said smaller pipe through said slotted clamping ring and packing rings.

4. In a device of the class described, a pipe, a ring on the lower end of said pipe, an inwardly projecting flange in said ring, a second pipe extending up through said ring within said second pipe, packing rings around said second pipe adjacent said flange to prevent the escape of the gas, a second ring part attached to said first ring by a suitable union ring, a slotted clamping ring within said second ring part, a spring within said ring around said second pipe, a dividing casing within said rings and around said spring and pressed thereby upon said slotted clamping ring to clamp said second pipe, and a lever for releasing the pressure of said spring on said slotted clamping ring to permit the sliding of said second pipe within the joint.

5. In a device of the class described, a pipe, a ring attached to the end of said pipe, an inwardly projecting annular flange within said ring, a ring portion attached to said first ring portion by a suitable union ring and thread, a smaller pipe extending up within said ring portions and first pipe, packing rings around said smaller pipe adjacent said annular flange to prevent the escape of the gas, a slotted clamping ring within said second ring portion to clamp the outer side of said smaller pipe, a divided casing within said ring portions, a coil spring within said divided casing to press one part thereof against said packing rings and the other against said slotted clamping ring to normally clamp the same upon said smaller pipe, a lever having rods attached thereto and attached to the upper portion of said divided casing, trunnions on said lever having a bearing on said second ring portion to compress said spring and remove the pressure thereof from said slotted clamping ring and permit the sliding of the joint, substantially as and for the purpose specified.

In testimony whereof I have affixed my signature in the presence of two witnesses.

JOHN FREDERICK SPJUT.

Witnesses:
H. A. SANDBERG,
NETTIE CARPENTER.

---

Copies of this patent may be obtained for five cents each, by addressing the "Commissioner of Patents, Washington, D. C."